Patented Aug. 6, 1940

2,209,985

UNITED STATES PATENT OFFICE 2,209,985

DIAZO COMPOSITION

Herbert A. Lubs, Wilmington, Del., assignor to E. I. du Pont de Nemours & Company, Wilmington, Del., a corporation of Delaware No Drawing. Application August 17, 1939, Serial No. 290,572

12 Claims. (Cl. 260—141)

This invention relates to improvements in the diazotization of aryl amines, and especially to new liquid compositions which are useful in the production of diazo solutions, to new diazo solutions and to new processes for manufacturing such diazo solutions.

The preparation of diazotized primary aryl amines which are free from solubilizing groups as commonly practiced for many years in the art of dyeing with ice colors has consisted in general of preparing a dilute solution or a suspension of a finely divided mineral acid salt of the arylamine in water which contains a considerable excess of mineral acid. Diazotization was then carried out at a low temperature, such as 0° to 5° C. by adding a suitable amount of an alkali metal nitrite. After the diazotization was completed, the pH value of the mixture and its concentration were adjusted so that they could be used on the fiber and for the development of the coupling component. Thus by suitably and severally disposing the components of the dye on the fiber, the coupling of the components or development effected a dyeing of the fiber with the product of coupling.

The primary arylamines referred to are devoid of solubilizing groups and they are insoluble or difficultly soluble in water and dilute mineral acids. In preparing the diazo of these arylamines considerable difficulty has been encountered heretofore in securing a solution or suspension of the diazotized amino base of as high concentration as was thought to be desirable for complete and rapid diazotization. The difficulty arose primarily from the fact that the amino bases were insoluble or were sparingly or difficultly soluble in the acidic media required for diazotization. For example, some of the amino bases could be brought into very dilute solution in the form of their acid salts only by heating them in a mineral acid and then diluting the mixture while others which formed even less soluble acid salts in the necessary mineral acid medium had to be suspended in a greatly diluted medium in a very finely divided state. For diazotization the solutions or suspensions had to be cooled to a low temperature either by adding ice or by external cooling. External cooling was costly and inconvenient, and the addition of ice still further diluted the medium which was already too dilute to result in a diazo solution which could be used satisfactorily in the production of dyeings when strong shades were desired. Attempts have been made to overcome these difficulties in respect to some of the arylamines by supplying the dyers and printers with mineral acid salts instead of the arylamines themselves, but it was found that the previously prepared mineral acid salts did not diazotize readily in the acid diazotization media and they often did not dissolve as completely as the acid salts which were freshly prepared in the acid media. The use of mineral acid salts still required a highly diluted reaction medium. These circumstances made the available diazo costly to the dyer or printer, and more complete and more rapid diazotization were desired.

It is among the objects of the present invention to provide new solutions of arylamines. Another object of the invention is to provide new liquid compositions comprising a non-acidic water soluble solvent and an arylamine. Another object of the invention is to provide new processes for preparing diazo solutions. Another object of the invention is to provide concentrated diazo solutions derived from arylamines which are devoid of solubilizing groups. Still other objects of the invention will be apparent from the following description.

The objects of the invention are attained in general by mixing the diazotizable arylamine with a water soluble amide which is inert to mineral acids of concentrations used in diazotization and in which the amine is soluble. In diazotizing the arylamine contained in this solution, a mixture is made with an aqueous solution of suitable volume and containing a suitable quantity of acid for the formation of the acid salt of the arylamine. This yields either a solution of the acid salt of the arylamine or a finely divided suspension thereof. The solutions or suspensions of the acid salts of the arylamines have been found to be capable of rapid and complete diazotization in the medium thus produced by acting on them with nitrous acid. After diazotization any desired adjustment of the pH value of the diazo solution or dilution thereof can be made. Highly concentrated diazo preparations are made by using more or less highly concentrated solutions of the arylamines.

The invention will be more fully set forth in the following more detailed description which includes examples that are given as illustrative embodiments of the invention and not as limitations thereof and in which parts are expressed in parts by weight.

Example 1

To 128 parts of m-chloro-aniline were added 251 parts of dimethyl formamide with stirring. Complete solution was obtained immediately. To this solution were added 3.9 parts of sulfated lauryl alcohol. The resulting solution was clarified by adding 10 parts of activated charcoal, stirred for a short time, and filtered. To a cold, agitated solution of 16 parts of 32° Tw. hydrochloric acid in 500 parts of water and ice were added 14.7 parts of the above solution. The amine salt formed remained in almost complete solution. To this acidic solution were added 4 parts of sodium nitrite, dissolved in 12 parts of water with stirring. A clear diazo solution was obtained almost immediately. The solution was allowed to stand for 15 minutes, the excess acidity neutralized by adding 25 parts of a 50 per cent sodium acetate solution, and then diluted with cold water to a volume of 1000 parts.

Cotton piece goods was impregnated with the sodium salt of the anilide of 2:3-hydroxy-naphthoic-acid by the following method: Twenty parts of the anilide of 2:3-hydroxy-naphthoic-acid were pasted with forty parts of Turkey Red oil, caustic soda solution, 60 parts 32° Bé., were added and the mixture was stirred to a uniform paste. This paste was dissolved in sufficient water to make up a total of 1000 parts of solution. The cotton piece goods was padded with this solution at 120° F. and then dried over heated drums. The impregnated piece goods then was padded with the above described diazo solution. A bright orange dyeing resulted. The dyed material was rinsed, soaped, rinsed and dried in the usual manner.

Example 2

One hundred and forty two (142) parts of 4-chloro-2-amino-toluene were dissolved in 271 parts of dimethyl formamide. A clear solution resulted immediately on addition of the solvent with slight agitation. This solution was clarified and filtered.

To a cold, agitated solution of 16 parts of 32° Tw. hydrochloric acid in 500 parts of water and ice, temperature 0–5° C., were added 20.76 parts of the above solution. The amine salt remained in almost complete solution at this concentration. The solution of the amine salt was agitated and 16 parts of a 25 per cent solution of sodium nitrite were added. A clear diazo solution was obtained immediately. This solution may be neutralized with sodium acetate and diluted to the desired volume or used at the concentration obtained by this procedure in the manner described in Example 1.

Example 3

One hundred and seventy one (171) parts of 4-chloro-2-nitro-aniline were dissolved in 483 parts of dimethyl acetamide. To this solution were added 5 parts of sulfated lauryl alcohol. The solution was clarified by stirring with activated carbon and then filtered.

Forty-four (44) parts of the above solution were added, with stirring to a solution of 24 parts of 32° Tw. hydrochloric acid in 500 cc. water and ice at 0°–5° C. The amine precipitated in a very finely divided form. To this mixture were added 20 parts of a 25 per cent solution of sodium nitrite. Diazotization was complete after stirring the solution for from 2 to 5 minutes. A clear diazo solution free from undiazotized amine was obtained. Standard procedures used by the prior art required 30 minutes to 1 hour to diazotize this amine and then complete diazotization was seldom, if ever, accomplished.

Example 4

2:5-dichloro-aniline, 162 parts, was dissolved in 676 parts of dimethyl formamide. Sulfated lauryl alcohol, 10 parts was dissolved in this solution. The solution was clarified and filtered.

Forty-five and six tenths (45.6) parts of the above solution were added to a well agitated solution of 32 parts of 32° Tw. hydrochloric acid in 500 parts of water and ice at 0° C. Agitation was continued and 16 parts of a 25 per cent solution of sodium nitrite were added rapidly. Complete solution resulted within 2 to 5 minutes. A clear diazo solution, ready for use, was obtained in a small fraction of the time usually required to completely diazotize this amine. Standard procedures heretofore employed required that this difficultly soluble amine be dissolved in boiling dilute acid which then had to be cooled before diazotization. Such procedures are completely eliminated by the new process.

Example 5 m-Nitro-p-toluidine, 152 parts, was dissolved in 600 parts of dimethyl formamide. To this solution were added 5 parts of sulfated cetyl alcohol and the solution was clarified and filtered.

To a cold, well agitated solution of 18 parts of 32° Tw. hydrochloric acid in 500 parts of water and ice were added 34 parts of the above solution. A precipitate of very fine particles was produced. A solution of 4 parts of sodium nitrite in 12 parts of water was added to the suspension with stirring. A clear diazo solution, ready to neutralize and use, was obtained within 2 to 5 minutes after the addition of the sodium nitrite was complete. Standard procedures heretofore used required that this base be pasted with boiling water, then cooled before diazotization. In such a diazotization 30 to 60 minutes usually elapsed before a complete solution could be obtained.

Example 6

5-nitro-2-amino-anisole, 168 parts, was dissolved in 870 parts of dimethyl formamide. The solution was stirred for 10 minutes and then clarified and filtered. To this solution were added 255 parts of a 33⅓ per cent aqueous solution of sodium nitrite.

A portion of the above solution, 61.5 parts, was added to a cold agitated solution of 16 parts of 32° Tw. hydrochloric acid in 500 parts of water and ice. A clear diazo solution was obtained upon stirring the mixture for from 3 to 5 minutes. This solution was neutralized with sodium acetate and diluted with water up to 1000 parts.

Example 7 o-Amino-azo-toluene, 224 parts, was dissolved in 290 parts of dimethyl formamide. Complete solution resulted after stirring for 5 to 10 minutes.

To a cold, agitated solution of 14 parts of 32° Tw. hydrochloric acid in 500 parts of water and ice were added 17.35 parts of the above solution. The amine salt precipitated in a finely divided form. To the suspension of the amine salt were added 16 parts of a 25 per cent solution of sodium nitrite with stirring. Complete solution resulted on stirring for an additional five minutes. The diazo solution was diluted up to 1000 parts with cold water and the excess acid neutralized with sodium acetate.

Example 8

To 630 parts of dimethyl formamide were added, with stirring, 168 parts of 4-nitro-2-amino-anisole and 5 parts of sulfated lauryl alcohol. Complete solution resulted after stirring for 10 minutes. The solution was clarified by adding 5 parts of activated charcoal and filtering.

Thirty-three (33) parts of the above solution were added to a cold, agitated solution of 16 parts of 37 per cent hydrochloric acid in 500 parts of water and ice. The amine hydrochloride separated in a finely divided form. To this suspension were added 16 parts of a 25 per cent solution of sodium nitrite. A clear diazo solution resulted upon stirring the mixture for from 1 to 5 minutes. The excess acid was neutralized with sodium acetate and the solution was diluted to a total of 1000 parts.

*Example 9*

One hundred and seventy-one (171) parts of 4-chloro-2-nitro-aniline were dissolved in 483 parts mono-methyl-formamide. A portion of this solution was added to a solution of hydrochloric acid in water and ice, and the amine was diazotized as in Example 3.

Solutions of the same concentration were prepared with equal ease by using dimethyl formamide and diethyl-formamide as solvents, and useful diazo solutions were made therefrom.

*Example 10*

Twenty parts of 4-chloro-2-nitro-aniline were dissolved in 70 parts of mono-butyl-formamide. This solution was added to cold dilute hydrochloric acid and the amine diazotized by the procedure described in Example 3.

A solution of the same concentration was prepared by using mono-isobutyl-formamide as a solvent and useful diazotized compositions were made therefrom by methods similar to those heretofore described.

*Example 11*

Twenty parts of 4-chloro-2-nitro-aniline were dissolved in a solution of 40 parts of dimethyl-glycolamide in 40 parts of ethyl alcohol. This solution was added to cold dilute hydrochloric acid and the amine diazotized as in Example 3.

*Example 12*

Twenty parts of 5-nitro-2-amino-anisole were dissolved in forty parts of either dimethyl formamide or dimethyl-acetamide. The resulting solutions were added to cold dilute hydrochloric acid. The amine precipitated in a finely divided form. On addition of sodium nitrite solution to this suspension a clear diazo solution resulted within a few minutes.

Twenty parts of 5-nitro-2-amino-anisole were dissolved in sixty parts of diethyl-formamide or 100 parts of mono-methyl-formamide to give clear solutions, which may be used in a similar manner for preparing diazo solutions.

*Example 13*

Twenty parts of 4- or 5-nitro-2-amino-anisole were dissolved in forty parts of either formyl or acetyl-morpholine of the general formula

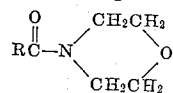

where R is hydrogen or a methyl group. The resulting solutions were added to cold, dilute hydrochloric acid. The amines precipitated in finely divided form. On addition of sodium nitrite solution to these suspensions clear diazo solutions were obtained in a few minutes.

In a similar manner other amines such as m-nitro-aniline, 4-chloro-2-nitro-aniline, 4- and 5-nitro-2-amino-toluenes, 4- and 5-chloro-2-amino toluenes, 3-nitro-4-amino-toluene and 3-nitro-4-amino-anisole were dissolved in formyl- and acetyl-morpholines and diazotized by the above procedure.

*Example 14*

Twenty parts of 4-chloro-2-amino-aniline were dissolved in twenty parts of dimethyl methoxy-acetamide. The resulting clear solution was diluted with an equal volume of the solvent, and one-half part of sulfated lauryl alcohol was added. This solution was poured into cold dilute hydrochloric acid. The amine separated in a finely divided form which diazotized readily on addition of sodium nitrite solution.

In the same manner other amines such as o, m and p-nitro-anilines, 4- and 5-nitro-2-amino-toluenes, 4- and 5-nitro-2-amino-anisoles, 4- and 5-chloro-2-amino-toluenes, 4-chloro-2-amino-anisole, 3-nitro-4-amino-toluene and 3-nitro-4-amino-anisole were dissolved in from 1 to 4 parts per part of dimethyl or diethyl methoxyacetamides. The resulting solutions were added to cold dilute hydrochloric acid and the amines were diazotized with sodium nitrite as in the preceding example.

Various of the preferred embodiments of the invention are set forth in the foregoing illustrations but many satisfactory modifications of the invention may be made, among which are variations in solvents, concentrations, temperatures and assisting agents. Any of the diazo solutions produced in accordance with the new process can be used to prepare pigments in substance by known procedures as well as to make dyeings on fibre.

The amides which are suitable for practicing the invention are those which are soluble in water, inert to mineral acids, such as the acids used in diazotization media, and in which the diazotizable arylamines referred to are soluble. Such amides are represented by the formula

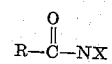

in which R is hydrogen, alkyl having 1 to 3 carbons, alkoxy-alkyl having 2 to 4 carbons or hydroxy methyl; the group —NX is the radical of morpholine or an acylic amide radical represented by the formula

wherein $R_1$ is an alkyl or alkoxyalkyl radical having 1 to 4 carbons and $R_2$ is hydrogen or $R_1$.

The class includes those aliphatic acid amides of the above description which contain a total of 2 to 8 carbons. As other illustrations of the large number of amides which can be used for the purposes of the invention, the following are mentioned, but it is to be understood that still other amides within the scope of the foregoing general formula can be used, monobutyl glycolamide, monobutyl acetamide, monopropyl formamide, monoisopropyl formamide and diethyl acetamide, dimethyl ethoxyacetamide, diethyl methoxyacetamide, diethyl ethoxyacetamide, methoxyacetyl morpholine, methoxyethyl formamide, dimethoxy ethyl formamide, dimethoxyethyl acetamide and ethoxyacetyl morpholine. Unless otherwise specified alkyl as used in the specification and claims refers to branched as well as straight chain radicals.

The preferred amides are those in which the acid radical is formic acetic, or methoxyacetic, and of these the dialkylamides are preferred, for example dimethyl-formamide, dimethyl-acetamide, and dimethyl methoxyacetamide.

Relatively highly concentrated solutions of the arylamines in the amides are preferred, say about 15 per cent to about 50 per cent. Concentrations of about 10 per cent to about 80 per cent give satisfactory results but higher or lower concentrations can be used.

The solubilities of the various arylamines in the amides vary, some of them being miscible in all proportions. The following list shows concentrations of various arylamines in the mono- and di-alkyl-amides which have given excellent, rapid and complete diazotization when treated similarly to the processes described in the foregoing examples. The list is illustrative of the invention and does not represent the limit of solubility of the amines, nor does it represent the only concentrations which give satisfactory results.

| Arylamine | Preferred concentrations (percent by weight) |
|---|---|
| m-Chloro-aniline | 30-50 |
| 2:5-dichloro-aniline | 15-25 |
| 4-chloro-2-nitro-aniline | 15-25 |
| m-Nitro-aniline | 30-20 |
| 4-chloro-2-amino-toluene | 30-50 |
| 5-chloro-2-amino-toluene | 30-50 |
| 4-nitro-2-amino-toluene | 30-40 |
| 5-nitro-2-amino-toluene | 15-30 |
| 3-nitro-4-amino-toluene | 15-25 |
| 4-chloro-2-amino-anisole | 15-25 |
| 4-nitro-2-amino-anisole | 15-25 |
| 5-nitro-2-amino-anisole | 30-40 |
| 3-nitro-4-amino-anisole | 30-40 |
| o-Amino-azo-toluene | 30-45 |
| Tolidine | 20-30 |
| Dianisidine | 15-20 |

The invention is useful in preparing diazos of all primary aryl amines which are devoid of sulfonic acid and carboxyl groups. Satisfactory solutions of higher molecular weight arylamines, such as amino diphenylamines, amino-anthraquinones and amino-benzanthrones and azo substituted arylamines are diazotized in accordance with the invention as well as the anilines and azo substituted anilines. The term arylamine as used in the specification and claims refers to all primary aryl amines which are devoid of sulfonic acid and carboxy groups and to such aryl amines which are substituted by other groups, such as azo groups, phenyl groups, acylamino groups and the like.

As illustrations of other arylamines the following are mentioned:

Aniline
o- and p-chloro-anilines
o- and p-nitro-anilines
4-nitro-2-chloroaniline
6-chloro-2-aminotoluene
o-, m- and p-xylidines
2:5-dimethoxy-aniline
2:5-diethoxy-aniline
3-methoxy-4-amino-toluene
3-methyl-4-amino-anisole
4-chloro-5-amino-2-benzoylamino-anisole
4-amino-6-benzoylamino-1:3-xylene
3-amino-4-methoxy-6-benzoyl-amino-toluene
4-benzoylamino-2:5-dimethoxy-aniline
4-benzoylamino-2:5-diethoxy-aniline
4-carbomethoxy-amino-2:5-diethoxy-aniline
3-amino-benzotrifluoride
2-chloro-5-amino-benzotrifluoride
2-amino-5-trifluoro-methyl-phenyl-ethyl-sulfone
4:4'-diamino-diphenylamine
4-amino-4'-methoxy-diphenylamine
a- and b-naphthylamines
m-Amino-azo-toluene
o-Phenetol-azo-a-naphthylamine
3-amino-carbazole In the diazotization of some of the arylamines, the acid salts do not remain in solution when the hydrous acid is added. In such cases it is advantageous but not essential to have present in the solution sufficient of a dispersing agent to promote the formation of small crystals of the amine. The presence of sufficiently small crystals accelerates the rate of complete diazotization so that complete diazotization takes place almost instantaneously upon the addition or generation of nitrous acid. Only a fraction of a percent by weight of a dispersing agent is ordinarily necessary or desirable but any quantity in excess of the minimum that is required to produce the desired effect can commonly be used.

In the specification and claims the term dispersing agent refers to compounds which promote the separation of fine crystals when an amine is thrown out of the amide solution by the addition of an acid or diazotization agent. Any such inert dispersing agent can be used, as illustrations of which the following are mentioned alkylated naphthalene-sulfonic acids, condensation products of naphthalene-sulfonic acids with formaldehyde and sulfated alcohols.

The amide solutions may contain added substances which are non-deleterious for the purposes intended, such as diluents and the like. Methanol, ethanol, isopropyl alcohol, ethylene glycol, ethyleneglycol monoethylether and many other diluents or harmless adventitious compounds may be present in the solutions.

When so-called reverse diazotization is desired the amide solutions of arylamines may be modified by adding the alkali metal nitrite or a water solution thereof to the amide solution as illustrated in Example 6. When a dispersing agent is advantageous in such solutions the solution is made up with at least sufficient nitrite to diazotize the arylamine when it is acidified, and with at least sufficient dispersing agent to promote the formation of fine crystals. This is a continuation in part of my application Serial No. 250,337, filed January 11, 1939.

Since from the foregoing description of the invention it will be apparent to those skilled in the art that various other embodiments of the invention may be made without departing from the spirit and scope thereof, it is to be understood that the invention is not limited to the specific illustrations thereof.

I claim:
1. A liquid composition of a diazotizable arylamine which comprises about 10 per cent to about 80 per cent by weight of a diazotizable arylamine which is devoid of solubilizing groups dissolved in a water soluble mono-carboxylic aliphatic acid amide represented by the formula

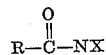

in which R is one of a group consisting of alkyl and alkoxy-alkyl radicals in which the alkyl radicals have not more than 3 carbons, hydroxy methyl and hydrogen; and —NX is one of a group consisting of the radical of morpholine and radicals represented by the formula

wherein $R_1$ is one of a group consisting of alkyl and alkoxy-alkyl having 1 to 4 carbons and $R_2$ is one of a group consisting of hydrogen and $R_1$, said aliphatic acid amide having a total of 2 to 8 carbons.

2. A liquid composition of a diazotizable arylamine which comprises a diazotizable arylamine which is devoid of solubilizing groups and a water soluble mono-carboxylic aliphatic acid amide which contains 2 to 8 carbons, the acid radical of said amide having 1 to 4 carbons, and the amine radical having 1 to 4 carbons, the amide radical being one of a group consisting of a cyclic tetramethylene ether and acyclic amide radicals in which one of the groups connected to the amino nitrogen is a radical of the group consisting of alkyl and alkoxyalkyl having 1 to 4 carbons, and the other radical connected to the amino nitrogen is one of a group consisting of hydrogen, alkyl and hydroxyalkyl having not more than 4 carbons.

3. A liquid composition of a diazotizable arylamine which comprises about 10 per cent to about 80 per cent of a diazotizable arylamine that is devoid of solubilizing groups, at least sufficient of an alkali metal nitrite to diazotize the arylamine upon acidification, and a solvent composed of a water soluble mono-carboxylic aliphatic acid alkyl amide represented by the formula $$R-\underset{\underset{O}{\|}}{C}-NX$$

in which R is one of a group consisting of alkyl and alkoxy-alkyl radicals in which the alkyl radicals have not more than 3 carbons, hydroxy methyl and hydrogen; and —NX is one of a group consisting of the radical of morpholine and radicals represented by the formula $$-N\begin{matrix}R_1\\R_2\end{matrix}$$

Wherein $R_1$ is one of a group consisting of alkyl and alkoxy-alkyl having 1 to 4 carbons and $R_2$ is one of a group consisting of hydrogen and $R_1$, said aliphatic acid amide having a total of 2 to 8 carbons.

4. A liquid composition of a diazotizable arylamide which comprises about 10 per cent to about 80 per cent of a diazotizable arylamine that is devoid of solubilizing groups, a solvent composed of a water soluble mono-carboxylic aliphatic acid amide and at least sufficient of a dispersing agent to promote a fine crystalline structure when the solution is acidified and an acid salt of low solubility is formed in the mixture, said amide solvent being represented by the formula $$R-\underset{\underset{O}{\|}}{C}-NX$$

in which R is one of a group consisting of alkyl and alkoxy-alkyl radicals in which the alkyl radicals have not more than 3 carbons, hydroxy methyl and hydrogen; and —NX is one of a group consisting of the radical of morpholine and radicals represented by the formula $$-N\begin{matrix}R_1\\R_2\end{matrix}$$

wherein $R_1$ is one of a group consisting of alkyl and alkoxy-alkyl having 1 to 4 carbons and $R_2$ is one of a group consisting of hydrogen and $R_1$, said aliphatic acid amide having a total of 2 to 8 carbons.

5. A liquid composition of a diazotizable arylamine which comprises about 10 per cent to about 80 per cent of a diazotizable arylamine that is devoid of solubilizing groups, a solvent composed of a water soluble mono-carboxylic aliphatic acid amide, at least sufficient of an alkali metal nitrite to diazotize the arylamine upon acidification, and at least sufficient of a dispersing agent to promote a fine crystalline structure when the solution is acidified and an acid salt of low solubility is formed in the mixture, said amide being represented by the formula $$R-\underset{\underset{O}{\|}}{C}-NX$$

in which R is one of a group consisting of alkyl and alkoxy-alkyl radicals in which the alkyl radicals have not more than 3 carbons, hydroxy methyl and hydrogen; and —NX is one of a group consisting of the radical of morpholine and radicals represented by the formula $$-N\begin{matrix}R_1\\R_2\end{matrix}$$

wherein $R_1$ is one of a group consisting of alkyl and alkoxy-alkyl having 1 to 4 carbons and $R_2$ is one of a group consisting of hydrogen and $R_1$, said aliphatic acid amide having a total of 2 to 8 carbons.

6. A liquid composition of a diazotizable arylamine which comprises about 10 per cent to about 80 per cent of a diazotizable arylamine that is devoid of solubilizing groups, a solvent composed of a water soluble mono-carboxylic aliphatic acid amide, at least sufficient of an alkali metal nitrite to diazotize the arylamine upon acidification, and at least sufficient of a dispersing agent to promote a fine crystalline structure when the solution is acidified and an acid salt of low solubility is formed in the mixture, said amide being represented by the formula $$R-\underset{\underset{O}{\|}}{C}-N\begin{matrix}R_1\\R_2\end{matrix}$$

in which $$R-\underset{\underset{O}{\|}}{C}-$$

is a radical of the group consisting of formic, acetic and methoxyacetic; and —$NR_1R_2$ is a dialkylamide radical wherein dialkyl has 2 to 4 carbons.

7. The process which comprises making a solution containing about 10 per cent to about 80 per cent by weight of a diazotizable arylamine which is devoid of solubilizing groups and a solvent composed of a water soluble monocarboxylic aliphatic acid amide represented by the formula $$R-\underset{\underset{O}{\|}}{C}-NX$$

in which R is one of a group consisting of alkyl and alkoxy alkyl radicals in which the alkyl radicals have not more than 3 carbons, hydroxy methyl and hydrogen; and —NX is one of a group consisting of a cyclic tetramethylene ether radical and radicals represented by the formula $$-N\begin{matrix}R_1\\R_2\end{matrix}$$

wherein $R_1$ is one of a group consisting of alkyl and alkoxy-alkyl having 1 to 4 carbons and $R_2$ is one of a group consisting of hydrogen and $R_1$, said aliphatic acid amide having a total of 2 to 8 carbons; and acting on said arylamine in the resulting medium with nitrous acid until the arylamine is diazotized.

8. The process which comprises making a solution comprising a diazotizable arylamine in which the solvent is a water soluble mono-carboxylic aliphatic acid amide which contains 2 to 8 carbons, the acid radical of said amide having 1 to 4 carbons, and the amine radical having 1 to 4 carbons, the radical comprising the amino nitrogen being one of a group consisting of a cyclic tetramethylene ether and acyclic amide radicals in which one of the groups connected to the amino nitrogen is a radical of the group consisting of alkyl and alkoxyalkyl having 1 to 4 carbons, and the other radical connected to amino nitrogen is one of a group consisting of hydrogen, alkyl and hydroxyalkyl having not more than 4 carbons; and acting on said arylamine in said solvent medium with nitrous acid until the arylamine is diazotized.

9. The process which comprises making a solution containing about 15 per cent to about 50 per cent of a diazotizable arylamine which is devoid of solubilizing groups and a solvent composed of a water soluble carboxylic aliphatic acid amide represented by the formula

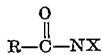

in which R is one of a group consisting of alkyl and alkoxy alkyl radicals in which the alkyl radicals have not more than 3 carbons, hydroxy methyl and hydrogen; and —NX is one of a group consisting of the radical of morpholine and radicals represented by the formula

wherein $R_1$ is one of a group consisting of alkyl and alkoxylalkyl having 1 to 4 carbons and $R_2$ is one of a group consisting of hydrogen and $R_1$, said aliphatic acid amide having a total of 2 to 8 carbons; and acting on said arylamine in said solvent medium with nitrous acid until the arylamine is diazotized.

10. The process which comprises making a solution containing about 15 per cent to about 50 per cent of a diazotizable arylamine which is devoid of solubilizing groups and a solvent composed of a mono-carboxylic aliphatic acid amide of a group consisting of formic acid, acetic acid, and methoxyacetic acid and alkyl amides in which the alkyl groups connected to amino nitrogen are straight or branched chains having 1 to 4 carbons and the total number of carbons in the amide does not exceed 8; and acting on said arylamine in the resulting medium with nitrous acid until the arylamine is diazotized.

11. The process which comprises making a solution containing about 15 per cent to about 50 per cent of a diazotizable arylamine which is devoid of solubilizing groups and a solvent composed of dimethyl formamide, adding at least sufficient of mineral acid to form the mineral acid salt of the arylamine, and acting on the arylamine in said medium with nitrous acid until the arylamine is diazotized.

12. The process which comprises making a solution containing about 15 per cent to about 50 per cent of a diazotizable arylamine which is devoid of solubilizing groups and a solvent composed of dimethyl acetamide, adding at least sufficient mineral acid to form the mineral acid salt of the arylamide, and acting on the arylamine in the resulting medium with nitrous acid until the arylamine is diazotized.

HERBERT A. LUBS.